(12) United States Patent
Queveau et al.

(10) Patent No.: US 6,585,307 B1
(45) Date of Patent: Jul. 1, 2003

(54) PIVOTING AND SLIDING TRUNK LID FOR CONVERTIBLE VEHICLE WITH FOLDING ROOF

(75) Inventors: Gérard Queveau, Cerizay (FR); Paul Queveau, Cerizay (FR); Jean-Marc Guillez, Cerizay (FR)

(73) Assignee: France Design, Cerizay (FR)

( * ) Notice: Subject to any disclaimer, the term of this patent is extended or adjusted under 35 U.S.C. 154(b) by 0 days.

(21) Appl. No.: 09/288,728

(22) Filed: Apr. 9, 1999

(30) Foreign Application Priority Data

Apr. 9, 1998 (FR) .............................. 98 04477

(51) Int. Cl.$^7$ ............................................. B62D 25/10
(52) U.S. Cl. ...................... 296/76; 296/107.08; 296/136
(58) Field of Search ...................... 296/76, 136, 107.08, 296/116

(56) References Cited

U.S. PATENT DOCUMENTS

| | | | | | |
|---|---|---|---|---|---|
| 2,535,600 | A | * | 12/1950 | Rappl | 296/76 |
| 2,622,400 | A | * | 12/1952 | Greer | 91/44 |
| 2,999,683 | A | * | 9/1961 | Pickles | 49/139 |
| 5,195,796 | A | * | 3/1993 | Wampler, II | 296/76 |
| 5,533,777 | A | * | 7/1996 | Kleemann et al. | 296/117 |
| 5,655,331 | A | | 8/1997 | Schrader et al. | |

* cited by examiner

*Primary Examiner*—D. Glenn Dayoan
*Assistant Examiner*—Patricia Engle
(74) *Attorney, Agent, or Firm*—Kenyon & Kenyon

(57) ABSTRACT

A trunk lid for a convertible vehicle with a folding roof can be opened on the one hand for stowing the folded roof in the trunk and on the other hand to obtain access to the trunk for stowing luggage. The trunk lid is fixed to the bodyshell so that it can pivot from the rear toward the front and simultaneously slide from the front toward the rear.

7 Claims, 1 Drawing Sheet

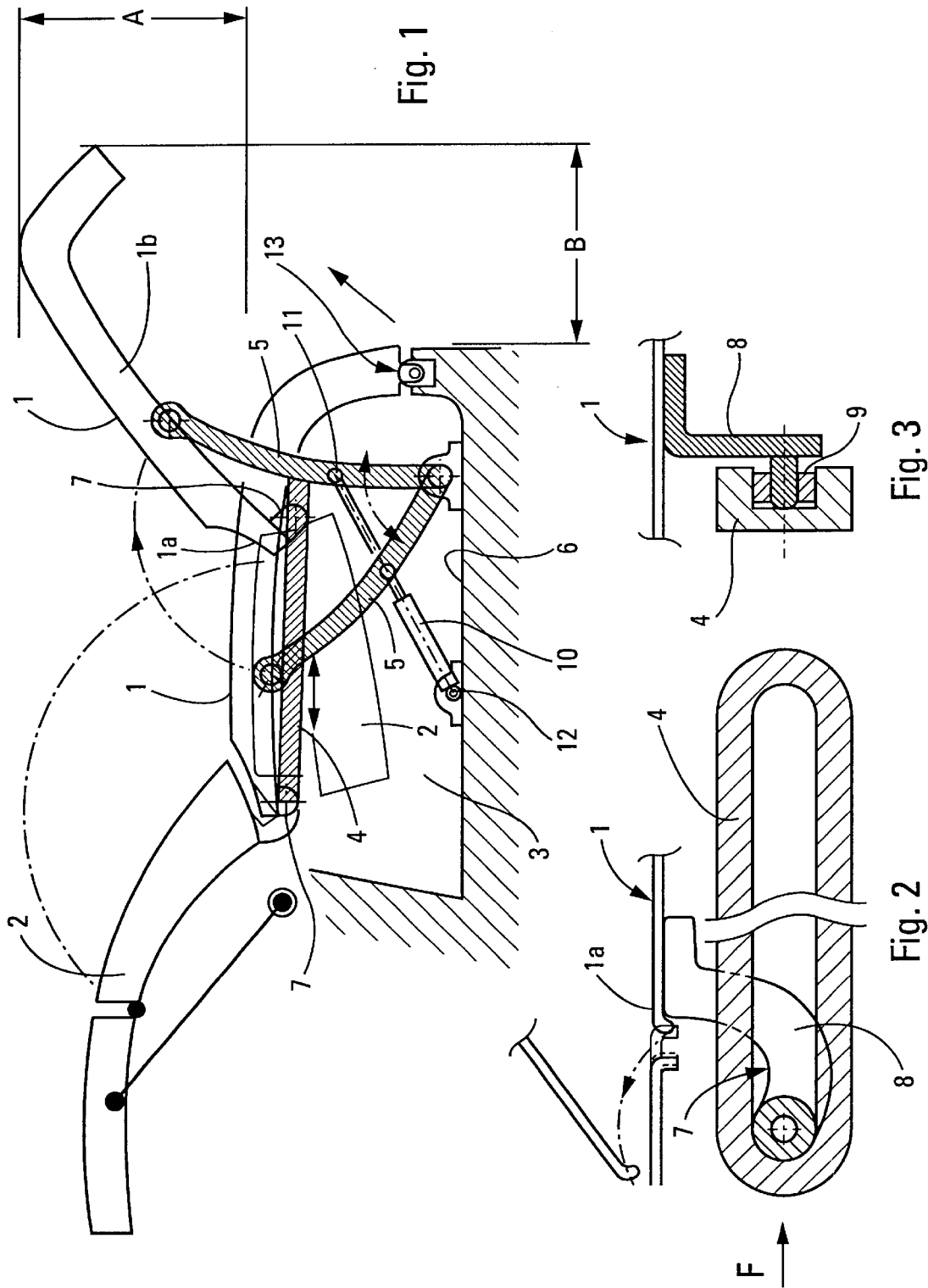

PIVOTING AND SLIDING TRUNK LID FOR CONVERTIBLE VEHICLE WITH FOLDING ROOF

BACKGROUND OF THE INVENTION

1. Field of the Invention

The present invention concerns a trunk lid for a convertible vehicle with a folding roof, comprising means for opening the trunk on the one hand for stowing the folded roof in the trunk and on the other hand to provide access to the trunk for stowing luggage.

2. Description of the Prior Art

The trunk lid of an automobile vehicle normally opens from the rear toward the front, which facilitates stowing luggage.

To stow the folded roof of a convertible vehicle it is necessary to be able to open the trunk from the front toward the rear. This is not convenient for stowing luggage, however.

A trunk lid has therefore been proposed which can open from the rear toward the front for stowing luggage and from the front toward the rear for stowing the folded roof of the convertible vehicle.

However, the above solution complicates the construction of the trunk lid.

The aim of the present invention is to create a trunk lid of simple construction and which opens only one way to fulfil both functions optimally, namely stowing the folded roof and stowing luggage.

SUMMARY OF THE INVENTION

The invention consists in a trunk lid for a convertible vehicle with a folding roof comprising means for opening the trunk lid on the one hand for stowing the folded roof in the trunk and on the other hand to obtain access to the trunk for stowing luggage, wherein the trunk lid is fixed to the bodyshell by means enabling the trunk lid to pivot from the rear toward the front and simultaneously to slide from the front toward the rear.

The trunk lid pivots toward the front so that luggage can be placed in the trunk from the rear and slides to the rear to open at the front of the trunk a space for stowing the folded roof.

In a preferred version of the invention the front part of the trunk lid is articulated to and slides along two slides on respective opposite sides of the trunk and at least one lateral edge of the trunk lid is articulated to one end of a tie-rod the other end of which is articulated to a part of the bodyshell adjacent the bottom of the trunk.

The trunk lid preferably moves between a closed position, in which the articulation of the trunk lid is at the front end of the slides and the tie-rod is inclined upward and forward, and an open position, in which the articulation of the trunk lid is at the rear end of the slides and the tie-rod extends upward, holding the trunk lid in an upwardly and rearwardly inclined position.

In an advantageous version of the invention a swan-neck part bent forward and downward is fixed to each end of the front edge of the trunk lid and carries at its end opposite the trunk lid a roller engaged in the adjacent slide.

Other features and advantages of the invention will become more apparent in the following description.

BRIEF DESCRIPTION OF THE DRAWINGS

In the accompanying drawings, which are given by way of non-limiting example only:

FIG. 1 is a diagrammatic view partly in longitudinal section of a convertible vehicle equipped with a trunk lid in accordance with the invention;

FIG. 2 is a view of a detail of a slide and of the articulation of the trunk lid mounted in the slide; and FIG. 3 is a view in the direction of the arrow F in FIG. 2.

DETAILED DESCRIPTION OF THE PREFERRED EMBODIMENT

Referring to FIG. 1, the trunk lid 1 of a convertible vehicle with folding roof 2 comprises means for opening the trunk lid 1 on the one hand for stowing the folded roof 2 in the trunk 3 and on the other hand to obtain access to the trunk for stowing luggage.

In accordance with the invention, the trunk lid 1 is fixed to the chassis by means enabling the trunk lid 1 to pivot from the rear toward the front and simultaneously to slide from the front toward the rear.

As shown in FIGS. 1 and 2, the front part 1a of the trunk lid 1 has on each side an articulation means 7 which is articulated to and slides on a corresponding slide 4 on respective opposite sides of the trunk 3. At least one lateral edge 1b of the trunk lid 1 is articulated to one upper end of a tie-rod 5 the other bottom end of which is articulated to a part of the bodyshell adjacent the bottom 6 of the trunk 3.

As shown in FIG. 1, the trunk lid 1 is mobile between a closed position, in which each of the articulation means 7 of the trunk lid is at the front end of the slides 4 and the tie-rod 5 is inclined upwards and forwards with respect to its bottom end, and an open position, in which each of the articulation means 7 of the trunk lid 1 is at the rear end of the slides 4 and the tie-rod 5 extends upwards with respect to its bottom end, supporting the trunk lid in an upwardly and rearwardly inclined position.

As shown in FIGS. 1 and 2, a swan-neck part 8 bent toward the front and downward is fixed to each end of the front edge 1a of the trunk lid 1 and its end opposite the trunk lid carries a roller 9 engaged in the adjacent slide 4.

The trunk lid 1 is opened by an electric or hydraulic actuator 10.

In the example shown, the actuator 10 is articulated at 11 and 12 between the tie-rod 5 and a part of the bodyshell adjacent the bottom 6 of the trunk 3.

A compensator system such as a compensator actuator or spring can be provided to balance the trunk lid 1.

The trunk lid 1 is held closed by a latch 13 at the rear of the trunk lid. The latch 13 can be manually or electrically operated. If it is electrically operated a pushbutton inside the vehicle simultaneously unlocks the latch 13 and operates the electrical actuator 10.

The device just described operates in the following manner.

To stow the folding roof 2 in the trunk or merely to place luggage in the trunk, all that is required is to unlock the trunk lid and operate the actuator 10.

The actuator 10 pushes the tie-rod 5 from the inclined position to the upright position shown in FIG. 1.

Pivoting of the tie-rod 5 between the above two positions rotates the trunk lid 1 upward and slides it rearward.

At the end of its travel the trunk lid 1 projects beyond the rear of the vehicle a distance B and upward a distance A.

In this position the trunk lid 1 uncovers at the front an opening sufficient for stowing the folded roof 2 and at the rear an opening sufficient for stowing luggage.

Of course, the invention is not limited to the embodiment just described and many modifications can be made thereto without departing from the scope of the invention.

What is claimed is:

1. A convertible vehicle having a trunk and a folding roof adapted to be stowed in folded position inside said trunk, said vehicle having a trunk lid fixed to a bodyshell of the vehicle by a means for guiding said trunk lid between a closed position and an open position, wherein one slide is located on each respective opposite side of the trunk, and the trunk lid has on each respective opposite side of a front part thereof, a lid articulation means pivotingly and slidingly engaged in a corresponding slide, wherein at least one tie-rod is connected at an upper end thereof by a first rod articulation means to a corresponding side edge of said trunk lid and at an opposite bottom end thereof by a second rod articulation means to a part of the bodyshell adjacent to a bottom of the trunk, wherein in the closed position of said trunk lid, each lid articulation means is at a front end of the corresponding slide and said tie-rod is inclined upwards and forwards with respect to its bottom end, and wherein in the open position of said trunk lid, each lid articulation means is at the rear end of the corresponding slide and said tie-rod extends upwards with respect to its bottom end and holds the trunk lid in an upwards and rearwards inclined position, so that when opening the trunk lid, said trunk lid pivots from the rear towards the front and simultaneously slides from the front towards the rear and that in its open position, the trunk lid makes it possible to stow the folding roof into the trunk and provide an access for stowing luggage into said trunk.

2. A convertible vehicle according to claim 1, wherein each lid articulation means is a roller.

3. A convertible vehicle according to claim 1, wherein the tie-rod has a fixed length.

4. A convertible vehicle according to claim 1, wherein a swan-neck part, bent forwards and downwards is fixed to each side end of a front edge of said trunk lid and carries at an end thereof opposite said trunk lid the corresponding lid articulation means engaged in the adjacent slide.

5. A convertible vehicle according to claim 1, wherein said trunk lid is opened by an electric or hydraulic actuator.

6. A convertible vehicle according to claim 5, wherein said actuator is articulated at an upper end thereof to said tie-rod and at a bottom end thereof to a part of the bodyshell adjacent the bottom of the trunk.

7. A convertible vehicle according to claim 1, adapted to be held closed by a latch at the rear of said trunk lid.

* * * * *